US010683900B2

(12) United States Patent
Mitrovic et al.

(10) Patent No.: US 10,683,900 B2
(45) Date of Patent: Jun. 16, 2020

(54) CLUTCH DEVICE FOR GAS TURBINE ENGINES

(71) Applicant: PRATT & WHITNEY CANADA CORP., Longueuil (CA)

(72) Inventors: Lazar Mitrovic, Longueuil (CA); Keith Morgan, Westmount (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 64 days.

(21) Appl. No.: 15/484,506

(22) Filed: Apr. 11, 2017

(65) Prior Publication Data

US 2018/0283468 A1 Oct. 4, 2018

Related U.S. Application Data

(60) Provisional application No. 62/478,205, filed on Mar. 29, 2017.

(51) Int. Cl.
*F16D 25/061* (2006.01)
*B64D 27/10* (2006.01)
(Continued)

(52) U.S. Cl.
CPC ........... *F16D 25/061* (2013.01); *B64D 27/10* (2013.01); *F02C 6/206* (2013.01); *F02C 7/36* (2013.01);
(Continued)

(58) Field of Classification Search
CPC ................................................ F16D 2011/002
See application file for complete search history.

(56) References Cited

U.S. PATENT DOCUMENTS 2,741,351 A * 4/1956 Fletcher .................. F16D 11/10
192/21
3,485,462 A * 12/1969 Spence .................. B64D 27/02
244/55
(Continued)

FOREIGN PATENT DOCUMENTS

DE 2006518 A1 2/1971
FR 3029172 * 6/2016
WO WO2017/198999 11/2017

OTHER PUBLICATIONS

European Search Report received in counterpart Application No. EP18165229.
(Continued)

*Primary Examiner* — Mark A Manley
(74) *Attorney, Agent, or Firm* — Norton Rose Fulbright Canada LLP

(57) ABSTRACT

A clutch device for a gas turbine engine having a sliding coupling mounted to the engine and slidingly displaceable therein. The sliding coupling is mountable between the gearbox and the output shaft. The sliding coupling is continuously engageable with the gearbox and is selectively engageable with the output shaft to mechanically couple the output shaft to the gearbox. The sliding coupling is slidingly displaceable between a first position in which the sliding coupling is mechanically coupled to the output shaft to transmit a rotational drive of the output shaft to the gearbox, and a second position in which the sliding coupling is disengaged from the output shaft. A piston is disposed within the engine and acts on the sliding coupling to displace the sliding coupling to at least the second position.

15 Claims, 7 Drawing Sheets

(51) Int. Cl.

| | |
|---|---|
| *F02C 7/36* | (2006.01) |
| *F16D 1/10* | (2006.01) |
| *F02C 6/20* | (2006.01) |
| *F16D 11/14* | (2006.01) |
| *F16D 25/12* | (2006.01) |
| *F16F 11/00* | (2006.01) |
| *F16D 11/00* | (2006.01) |

(52) U.S. Cl.
CPC ............... *F16D 1/10* (2013.01); *F16D 11/14* (2013.01); *F16D 25/12* (2013.01); *F05D 2220/323* (2013.01); *F05D 2220/327* (2013.01); *F05D 2260/406* (2013.01); *F05D 2260/4023* (2013.01); *F16D 2001/103* (2013.01); *F16D 2011/002* (2013.01)

(56) References Cited

U.S. PATENT DOCUMENTS

| | | | |
|---|---|---|---|
| 3,602,535 A | 8/1971 | Behning et al. | |
| 3,771,916 A * | 11/1973 | Flanigan | F02C 3/10 |
| | | | 180/301 |
| 4,514,071 A | 4/1985 | Koeninger et al. | |
| 4,885,909 A | 12/1989 | Rodgers | |
| 5,174,109 A | 12/1992 | Lampe | |
| 7,805,947 B2 | 10/2010 | Moulebhar | |
| 8,881,534 B2 | 11/2014 | Copeland et al. | |
| 9,382,910 B2 * | 7/2016 | Jan | F04D 17/10 |
| 9,890,704 B2 | 2/2018 | Speak et al. | |
| 10,041,409 B2 | 8/2018 | Snyder et al. | |
| 10,125,692 B2 | 11/2018 | Ernst | |
| 2010/0051360 A1 * | 3/2010 | Oba | B60L 50/16 |
| | | | 180/65.22 |
| 2010/0162723 A1 | 7/2010 | Copeland et al. | |
| 2011/0001400 A1 | 1/2011 | Chiba et al. | |
| 2014/0318144 A1 | 10/2014 | Lazzeri et al. | |
| 2014/0335992 A1 * | 11/2014 | Lee | F16H 48/10 |
| | | | 475/248 |
| 2015/0078888 A1 | 3/2015 | Golshany et al. | |
| 2016/0167799 A1 * | 6/2016 | Smaoui | F02C 6/12 |
| | | | 701/16 |
| 2017/0023075 A1 * | 1/2017 | Nozu | F16D 48/066 |
| 2017/0321601 A1 * | 11/2017 | Lafargue | B64D 27/24 |
| 2018/0283468 A1 | 10/2018 | Mitrovic et al. | |

OTHER PUBLICATIONS

A New Approach to Turboshaft Engine Growth, M. A. Compagnon, General Electric Company, Lynn, Massachusetts pp. 80-41-1 to 80-41-6, May 13, 1980.

* cited by examiner

CLUTCH DEVICE FOR GAS TURBINE ENGINES

CROSS-REFERENCE TO RELATED APPLICATIONS

This application claims priority from U.S. provisional patent application No. 62/478,205, filed Mar. 29, 2017, the entire contents of which are incorporated by reference herein.

TECHNICAL FIELD

The application relates generally to gas turbine engines and, more particularly, to a clutch device for such engines.

BACKGROUND OF THE ART

Aircrafts have power requirements which are not related to propulsion. These can include ground services, such as providing air to the cabin, providing electrical power for the aircraft's system, and assisting with main engine start. These ground services are generally provided by one or more of the main propulsion gas turbine engines of the aircraft, or an auxiliary power unit (APU) on larger aircraft.

SUMMARY

In one aspect, there is provided a clutch device for a gas turbine engine having a gearbox and a rotational output shaft, the clutch device comprising: a sliding coupling mounted to the engine and slidingly displaceable therein, the sliding coupling being mountable between the gearbox and the output shaft, the sliding coupling being continuously engageable with the gearbox and being selectively engageable with the output shaft to mechanically couple the output shaft to the gearbox, the sliding coupling being slidingly displaceable between a first position in which the sliding coupling is mechanically coupled to the output shaft to transmit a rotational drive of the output shaft to the gearbox, and a second position in which the sliding coupling is disengaged from the output shaft; and a piston disposed within the engine and acting on the sliding coupling to displace the sliding coupling to at least the second position.

In another aspect, there is provided a method of mounting a clutch to a gas turbine engine having a gearbox and an output shaft, the method comprising: positioning the clutch between the gearbox and the output shaft; mechanically and continuously coupling the clutch to the gearbox; and coupling the clutch to the output shaft to engage the output shaft and transmit a rotational drive of the output shaft to the gearbox, and to disengage the output shaft.

In a further aspect, there is provided a method of operating a gas turbine engine having a gearbox and an output shaft, the method comprising: mechanically coupling a clutch to the output shaft during at least a flight operating mode of the gas turbine engine, the clutch being continuously mechanically coupled to the gearbox; and disengaging the clutch from the output shaft during a ground operating mode of the gas turbine engine.

In a further aspect, there is provided a gas turbine engine, comprising: a gearbox, an output shaft, and a clutch device comprising: a sliding coupling mounted to the engine and slidingly displaceable therein, the sliding coupling being mountable between the gearbox and the output shaft, the sliding coupling being continuously engageable with the gearbox and being selectively engageable with the output shaft to mechanically couple the output shaft to the gearbox, the sliding coupling being displaceable between a first position in which the sliding coupling is mechanically coupled to the output shaft to transmit a rotational drive of the output shaft to the gearbox, and a second position in which the sliding coupling is disengaged from the output shaft; and a piston disposed within the engine and mounted to the sliding coupling to displace the sliding coupling to at least the second position.

DESCRIPTION OF THE DRAWINGS

Reference is now made to the accompanying figures in which.

DETAILED DESCRIPTION

Figure 1:
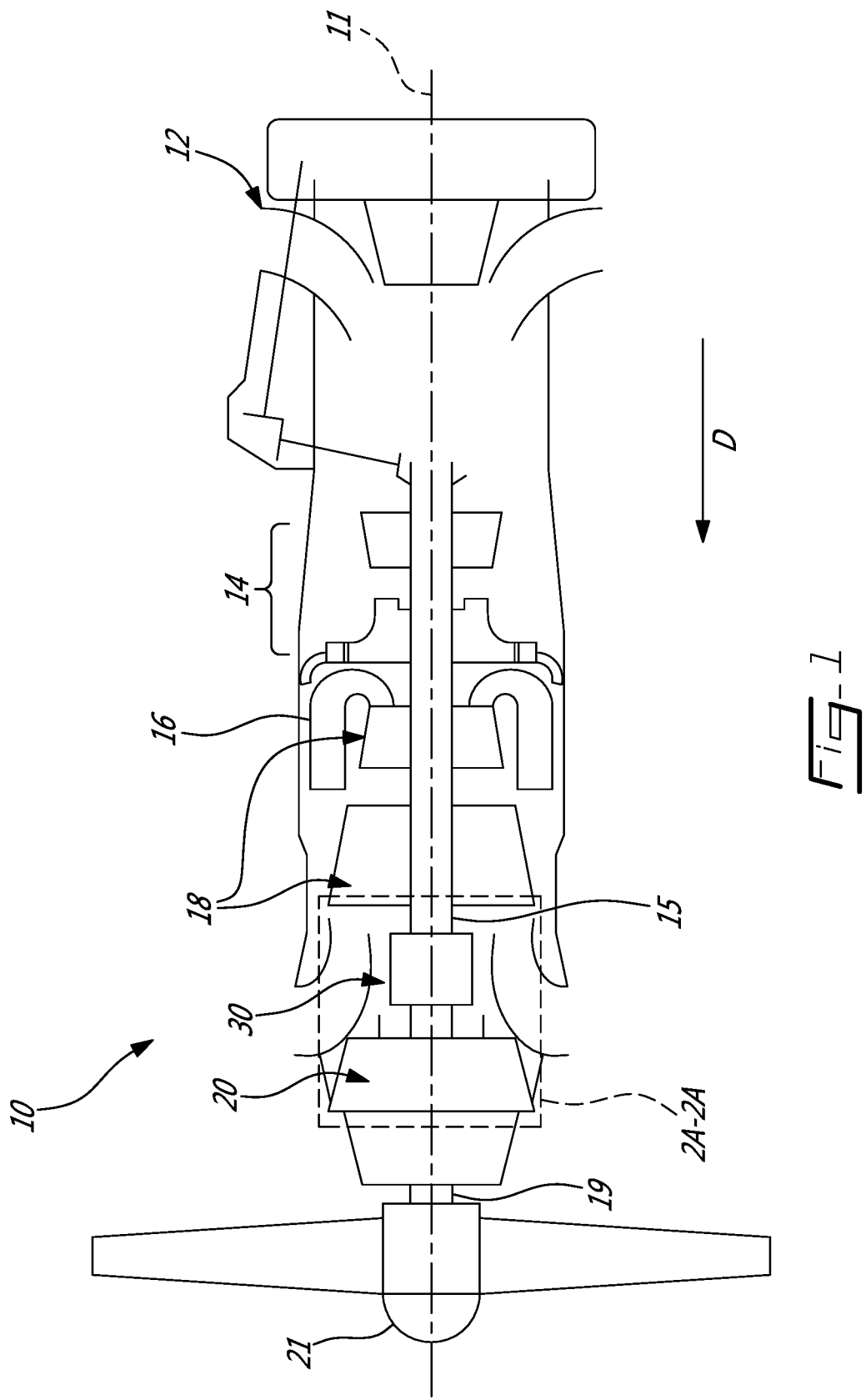
FIG. 1 is a schematic cross-sectional view of a gas turbine engine.

FIG. 1 illustrates a turboprop gas turbine engine 10 of a type preferably provided for use in subsonic flight, generally comprising in serial flow communication an intake 12 through which air is drawn, a compressor section 14 for pressurizing the air, a combustor 16 in which the compressed air is mixed with fuel and ignited for generating an annular stream of hot combustion gases, and a turbine section 18 for extracting energy from the combustion gases. A power turbine shaft 15 connected to one or more turbine(s) of the turbines section 18 projects forwardly to transmit a driving force to an output shaft 19 including a propeller 21 via a reduction gearbox generally shown at 20. The turbomachinery of the gas turbine engine 10 rotates about a longitudinal center axis 11.

The engine 10 includes a clutch device 30 disposed between the reduction gearbox 20 and the power turbine shaft 15. The clutch device 30 is configured to selectively couple an output shaft, which in the embodiment of FIG. 1 is the power turbine shaft 15, to a gearbox, which is shown as the reduction gearbox 20. The clutch device 30 is therefore configured to establish a mechanical link between the power turbine shaft 15 and the reduction gearbox 20, and is also configured to break the mechanical link between these components of the gas turbine engine 10.

In the illustrated embodiment, the clutch device 30 is a separate component from both the power turbine shaft 15 and the reduction gearbox 20. More particularly, the clutch device 30 is "modular" in that it can be a self-contained unit mounted to different types of gas turbine engines 10 between the turbomachinery of the gas turbine engine 10 (an output of which includes the power turbine shaft 15) and the reduction gearbox 20. In the depicted embodiment, the clutch device 30 does not affect the configuration or components of either the reduction gearbox 20 or the power turbine shaft 15, these components remaining substantially unchanged whether the clutch device 30 is installed between them or not. In the depicted embodiment, in which the gas turbine engine 10 is a "reverse-flow" engine, the clutch device 30 is disposed aft or rearward of the gearbox 20 and forward of the power turbine shaft 15. The forward direction is defined as being along the direction of travel D of gases through the gas turbine engine 10, and the rearward direction is opposite to the direction of travel D. It will be appreciated that the clutch device 30 can be positioned elsewhere in the depicted gas turbine engine 10, and in other gas turbine engines 10.

Figure 2A:
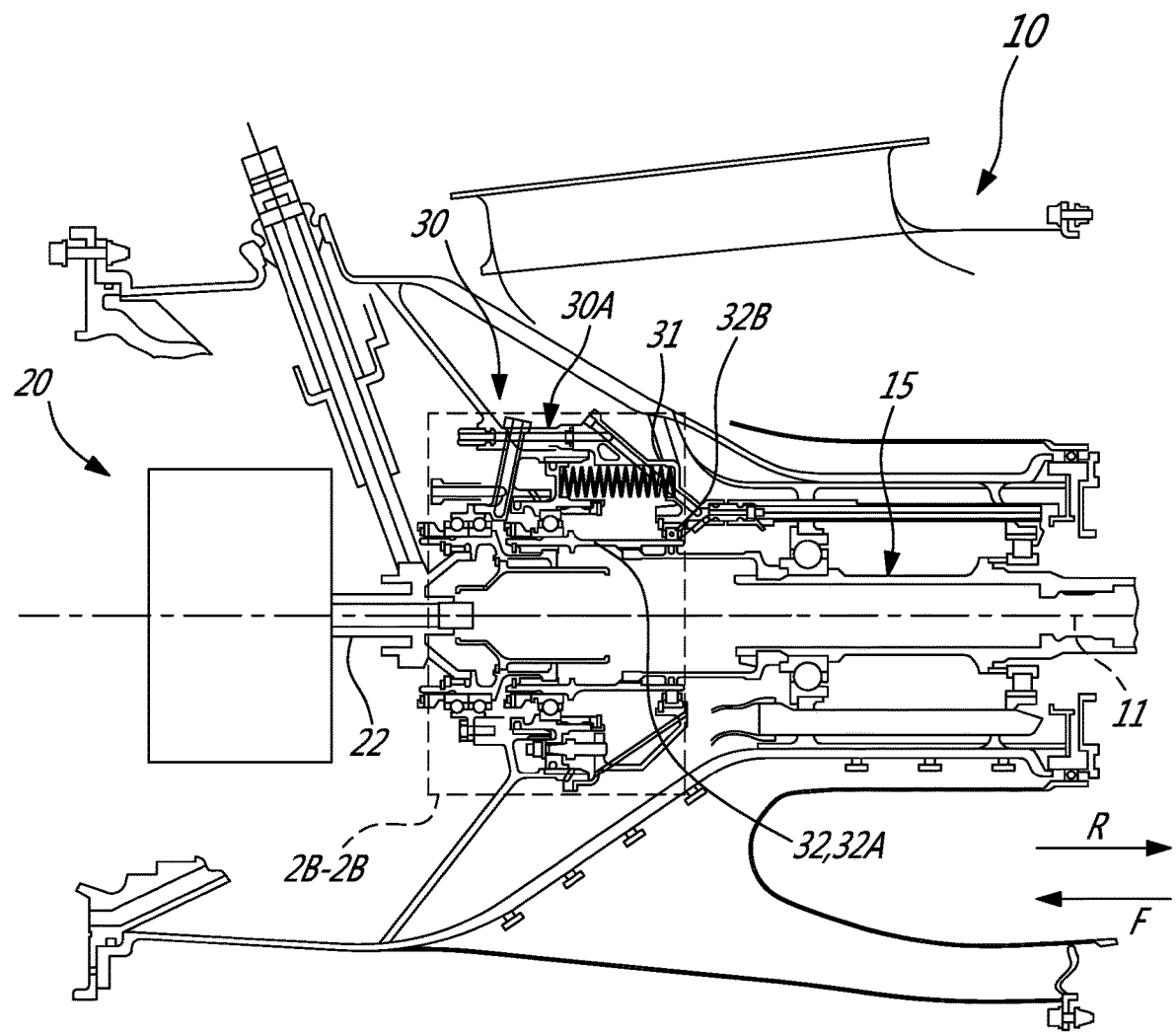
FIG. 2A is a cross-sectional view of the highlighted portion of FIG. 1, showing a gearbox, a clutch device, and an output shaft of the gas turbine engine.

Referring to FIG. 2A, the clutch device 30 mechanically couples, either directly or indirectly, the power turbine shaft 15 of the gas turbine engine 10 to the gearbox 20. When installed, one or more components of the clutch device 30 are continuously mechanically coupled to one or more components of the gearbox 20. In contrast, the clutch device 30 or components thereof selectively engage and disengage the power turbine shaft 15. Through this selective engagement with the power turbine shaft 15, the clutch device 30 allows the rotational output or drive of the power turbine shaft 15 to drive the gearbox 20, and also allows the power turbine shaft 15 to operate independently of the gearbox 20. The operation of the clutch device 30 can also be controlled by a suitable controller as a function of many parameters, such as engine operating mode.

In the embodiment of FIG. 2A, the clutch device 30 includes a clutch housing 30A. The clutch housing 30A is composed of a single component or multiple components. The clutch housing 30A or a portion thereof is fixedly mounted to a casing of the gas turbine engine. The clutch housing 30A includes a clutch cover 31. In the depicted embodiment, the clutch cover 31 is an annular body having an inner passage for receiving therein the power turbine shaft 15 and an input shaft 22 of the gearbox 20. At least one embodiment of the clutch cover 31 is described in greater detail below.

The clutch device 30 also includes a sliding coupling 32 mounted to the engine 10 or a component thereof. In the embodiment of FIG. 2A, the sliding coupling 32 is mounted to the clutch housing 30A. More particularly, the sliding coupling 32 is mounted to the clutch cover 31. In alternate embodiments, the sliding coupling 32 is mounted to other components of the engine 10. The sliding coupling 32 is continuously engaged with the input shaft 22 of the gearbox 20 such that the sliding coupling 32 is always rotatably coupled to the input gear of the gearbox 20. Conversely, the sliding coupling 32 is selectively engaged with the power turbine shaft 15. The sliding coupling 32 is therefore disposed between the gearbox 20 and the power turbine shaft 15, such that rotational drive from the power turbine shaft 15 passes through the sliding coupling 32 and then to the gearbox 20. The sliding coupling 32 can thus take any suitable configuration to achieve the above-described functionality. For example, in the embodiment shown in FIG. 2A, the sliding coupling 32 is a rotating component. More particularly, the sliding coupling 32 is a hollow shaft 32A that is co-axial with the power turbine shaft 15 and with the input shaft 22 of the gearbox 20. In some engine operating modes, the hollow shaft coupling 32A transmits rotational drive from the power turbine shaft 15 to the input shaft 22. The sliding coupling 32 is housed within the clutch cover 31 and mounted thereto to allow relative sliding movement between the sliding coupling 32 and the clutch cover 31. In the embodiment shown in FIG. 2A, bearings 32B support the sliding coupling 32 and allow its sliding displacement. Other mounting configurations for the sliding coupling 32 are possible.

The sliding coupling 32 is selectively engageable with the power turbine shaft 15 to mechanically couple the power turbine shaft 15 to the gearbox 20, and thus to mechanically couple the gearbox 20 to the turbomachinery of the gas turbine engine 10. This selective engagement is achieved by sliding the sliding coupling 32 toward the power turbine shaft 15 to engage it, and by sliding the sliding coupling 32 away from the power turbine shaft 15 to disengage. In the depicted embodiment, the sliding coupling 32 is mounted aft of the gearbox 20 and forward of the power turbine shaft 15. The sliding coupling 32 therefore slides in an aft or rearward direction R to engage the power turbine shaft 15, and slides in an opposite, forward direction F to disengage from the power turbine shaft 15.

Figure 2B:
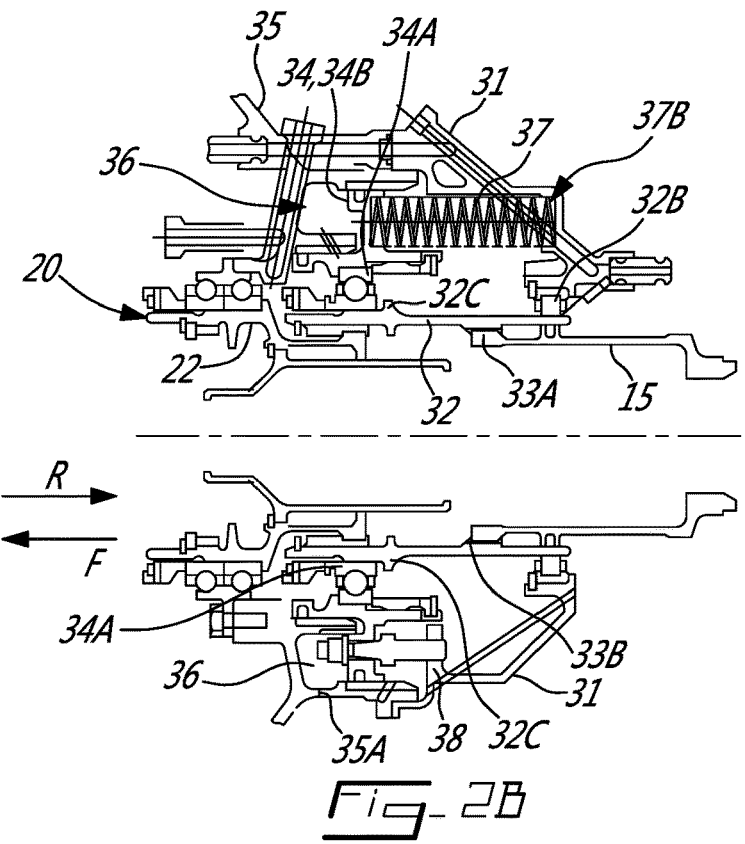
FIG. 2B is an enlarged cross-sectional view of the highlighted portion of FIG. 2A, the clutch device being shown in a second position.

The sliding coupling 32 is therefore displaceable between a first position and a second position, both of which are now described. In the first position, an example of which is shown in FIG. 2B, the sliding coupling 32 is mechanically coupled, directly or indirectly, to the power turbine shaft 15 to transmit a rotational drive of the power turbine shaft 15 to the gearbox 20. To maintain the continuous coupling between the sliding coupling 32 and the gearbox 20, the input shaft 22 of the gearbox 20 may also slide with the sliding coupling 32 in the same direction. In an alternate embodiment, the input shaft 22 remains stationary, such that the sliding coupling 32 is the only component of the input shaft 22 and the power turbine shaft 15 that undergoes axial displacement. In such an embodiment, the meshing portions of the input shaft 22 and the sliding coupling 32 overlap one another over the entire displacement range of the sliding coupling 32, such that the input shaft 22 remains continuously engaged to the sliding coupling 32. Such an embodiment is described in greater detail below.

Figure 2C:
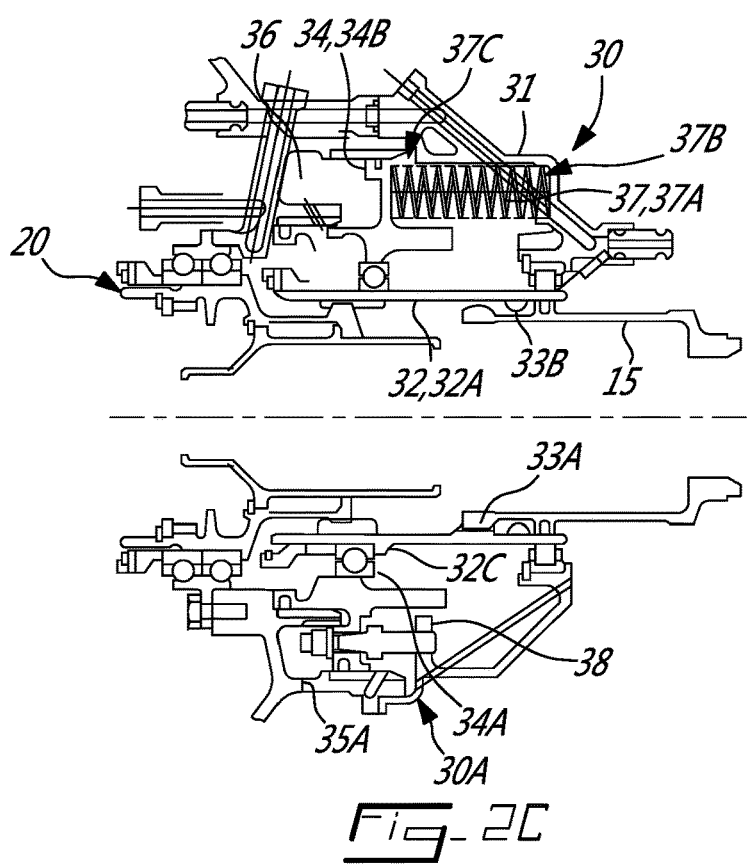
FIG. 2C is an enlarged cross-sectional view of the highlighted portion of FIG. 2A, the clutch device being shown in a first position.

The mechanical coupling of the sliding coupling 32 to the power turbine shaft 15 and to the input shaft 22 of the gearbox 20 is shown in FIGS. 2B and 2C. One of the sliding coupling 32 and the power turbine shaft 15 includes one or more spline segments 33A. The spline segment 33A is selectively engageable with corresponding grooves 33B in the other of the sliding coupling 32 and the power turbine shaft 15. In the depicted embodiment, the spline segment 33A is disposed on the power turbine shaft 15 and the corresponding grooves 33B are disposed on the sliding coupling 32, and it will be appreciated that this configuration can be reversed. FIGS. 2B and 2C show that the sliding coupling 32 and the input shaft 22 of the gearbox 20 have a spline/groove configuration as well. Using a spline/groove configuration helps to reduce the overall size of the clutch device 10, allowing it to remain compact particular when compared to the coupling arrangements of some conventional clutches which rely on relative large cone friction pads or cone clutches.

In the second position, an example of which is shown in FIG. 2C, the sliding coupling 32 is disengaged from the power turbine shaft 15. There is therefore no mechanical connection between the power turbine shaft 15 and the gearbox 20, which prevents the rotational drive of the power turbine shaft 15 from being transmitted to the gearbox 20.

The power turbine shaft 15 is therefore free to operate independently of the gearbox 20. In an embodiment, the second position of the sliding coupling 32 is selected during ground operation of the gas turbine engine 10. Since the power turbine shaft 15 is freed from having to drive an input gear of the gearbox 20 in the second position of the clutch device 30, the rotational drive provided by the power turbine shaft 15 can be used for other purposes. For example, the rotational drive provided by the power turbine shaft 15 can be used as, or coupled to, a generator which absorbs the rotational input in order to generate electrical power. Another possible use for the decoupled rotational drive of the power turbine shaft 15 is to drive a cabin air compressor (CAC), which provides air to the cabin of an aircraft.

During ground operating mode, an auxiliary power unit (APU) generally provides the following: a source of electrical power to the aircraft, a source of pneumatic power for cabin air. The APU typically provides this functionality with its own accessories. It will be therefore appreciated that the clutch device 30, by decoupling the gearbox 20 from the turbomachinery of the gas turbine engine 10, allows the decoupled power turbine shaft 15 to provide these services instead, so as to eliminate the need for a separate APU and its redundant accessories, added complexity, maintenance, emissions, and noise. In this regard, it should be noted that many airports around the world have limited the amount of time that APUs can be used prior to departure, or have prohibited their use outright.

In substantially all of the engine operating modes other than ground operating mode, the turbomachinery is operating most efficiently. During these engine operating modes (e.g. flight operating mode), the clutch device 30 couples the gearbox 20 to the power turbine shaft 15. The clutch device 30 therefore allows the turbomachinery of the gas turbine engine 10 to drive the gearbox 20 during operating modes of the gas turbine engine 10 where it is more efficient to do so. In an embodiment, these more efficient engine operating modes include all operating modes except ground engine operating mode. In such an embodiment, the ground operating mode is a unique engine operating mode. It will be appreciated that for applications in which two or more gas turbine engines 10 work in concert (e.g. in a multi-engine aircraft), the clutch device 30 can be provided for only one of the gas turbine engines 10.

Still referring to FIGS. 2B and 2C, the clutch device 30 also includes a piston 34 for slidingly displacing the sliding coupling 32. The piston 34 is disposed within the clutch housing 30A and mounted thereto. The piston 34 displaces in a linear fashion with respect to the clutch cover 31. The piston 34 is also mounted to the sliding coupling 32. In the depicted embodiment, there is no relative movement between the piston 34 and the sliding coupling 32. The piston 34 and the sliding coupling 32 are therefore displaced together. A bearing 34A supports the rotating sliding coupling 32 with respect to the non-rotating piston 34. When the piston 34 and the bearing 34A are displaced in the aft or rearward direction R, the bearing 34A slides along an outer surface of the sliding coupling 32 until it abuts against a flange 32C on the outer surface of the sliding coupling 32. The bearing 34A exerts a pressure against the flange 32C, causing the flange 32C and the sliding coupling 32 to slidingly displace with the piston 34 in the direction R. Other mounting configurations between the piston 34 and the sliding coupling 32 which achieve the above-described sliding displacement of the sliding coupling 32 are possible and within the scope of the present disclosure.

The piston 34 slidingly displaces the sliding coupling 32 to at least the second position shown in FIG. 2C. It is meant by "at least the second position" that the piston 34 in operation displaces the sliding coupling 32 into its second position to disengage the clutch device 30 from the power turbine shaft 15, and may in some instances also displace the sliding coupling 32 to the first position. This is the case in an embodiment where the piston 34 actively exerts a force to both slide the sliding coupling 32 to the second position, and to slide the sliding coupling 32 to the first position.

In the embodiment shown in FIGS. 2B and 2C, the piston 34 applies a force to slide the sliding coupling 32 only to the second position, and does not apply a force to slide the sliding coupling 32 to the first position. The force supplied by the piston 34 is generated with hydraulic fluid whose pressure builds up within a hydraulic fluid cavity. The clutch housing 30A also includes an annular casing 35 separate from and mounted to the clutch cover 31. An annular hydraulic fluid cavity 36 is formed between the casing 35 and the clutch cover 31. The piston 34 in the embodiment shown in FIGS. 2A and 2B includes a hydraulic piston 34B. The hydraulic piston 34B is actuated by hydraulic fluid and is disposed within the fluid cavity 36 to be displaced therein. When the fluid cavity 36 is filled with hydraulic fluid, the pressure of the hydraulic fluid within the fluid cavity 36 increases, and exerts a pressure against the head of the hydraulic piston 34B. This causes the hydraulic piston 34B to displace in the rearward direction R, and therefore displaces the attached sliding coupling 32 to the second position. The casing 35 has one or more bleed holes 35A in fluid communication with the fluid cavity 36 to drain hydraulic fluid from the fluid cavity 36. In an alternate embodiment, the bleed holes 35A are part of the clutch cover 31. When the fluid cavity 36 is drained of the hydraulic fluid via the bleed holes 35A, the hydraulic pressure acting against the head of the hydraulic piston 34B is reduced. The hydraulic piston 34B therefore no longer applies a force against the sliding coupling 32. The hydraulic piston 34B can therefore be displaced from the second position to thereby move the sliding coupling 32 to the first position, as explained in greater detail below.

Still referring to FIGS. 2B and 2C, once the piston 34 has displaced the sliding coupling 32 to the second position, the piston 34 stops applying a force on the sliding coupling 32, and the sliding coupling 32 is instead displaced in the direction of the first position with one or more biasing members 37. The biasing member 37 shown in FIGS. 2B and 2C is a torsional spring 37A, and it will be appreciated that other biasing members 37 are within the scope of the present disclosure. In other embodiments, one or more of the biasing members 37 include a helical coil spring, a leaf spring, and a cantilever spring, to set forth just a few non-limiting examples of devices capable of storing and releasing energy. Similarly, the number of biasing members 37 can vary, and they can be disposed at equal or unequal circumferential intervals about the annular clutch cover 31.

The biasing members 37 in operation apply a biasing force to the piston 34 to return the piston 34, and thus the sliding coupling 32 mounted thereto, to the first position shown in FIG. 2B. In an alternate embodiment, one or more of the biasing members 37 engage the sliding coupling 32 directly. In the depicted embodiment, a first end 37B of each biasing member 37 is mounted to the clutch cover 31, and an opposite second end 37C is mounted to the piston 34. When the piston 34 is deactivated such that it no longer applies sufficient force to displace the sliding coupling 32 to the second position, the biasing members 37 expand to apply a biasing force (e.g. a spring force) to displace the piston 34 and the sliding coupling 32 to the first position. When the piston 34 is activated to displace the sliding coupling 32 to the second position, the displacement of the piston 34 in direction R compresses the biasing members 37 such that the piston 34 works against the spring force of the biasing members 37. In this embodiment, where the piston 34 is operable to displace the sliding coupling 32 only to the second position, the default position of the sliding coupling 32 is the first position. Stated differently, the position in which the sliding coupling 32 finds itself for almost all engine operating modes is the first position in which the gearbox 20 is mechanically coupled to the power turbine shaft 15.

In the particular embodiment shown in FIGS. 2B and 2C, the biasing members 37 cooperate with the hydraulic piston 34B as follows. In order to disengage the sliding coupling 32 from the power turbine shaft 15 and thus disengage the gearbox 20 from the turbomachinery as shown in FIG. 2C, hydraulic fluid is pumped into the fluid cavity 36 to increase the fluid pressure therein and displace the hydraulic piston 34B. The hydraulic piston 34B is therefore displaced and displaces with it the sliding coupling 32 to disengage it from the power turbine shaft 15. The displacement of the hydraulic piston 34B works against the biasing members 37 by compressing them. In order to engage the sliding coupling 32 with the power turbine shaft 15 and thus engage the gearbox 20 with the turbomachinery as shown in FIG. 2A, no hydraulic fluid is supplied to the fluid cavity 36. Without a supply of hydraulic fluid, the hydraulic fluid within the fluid cavity 36 drains out via the bleed holes 35A. Without fluid pressure acting against the hydraulic piston 34B, the biasing members 37 extend and exert a biasing force against the hydraulic piston 34B. This causes the hydraulic piston 34B and the sliding coupling 32 mounted thereto to displace in the forward direction F to the first position where it is engaged with the power turbine shaft 15.

Still referring to FIGS. 2B and 2C, the clutch device 30 includes one or more movement limiters 38. Each movement limiter 38 limits the stroke of the piston 34 and allows adjustment thereof. The piston 34 is therefore configurable to displace only the amount needed. Each movement limiter 38 extends between the clutch cover 31 and the piston 34. In the depicted embodiment, each movement limiter 38 is in the form of a snubber, and also helps to prevent rotation of the piston 34 caused by its engagement with the rotating hollow shaft coupling 32A.

Figure 3:
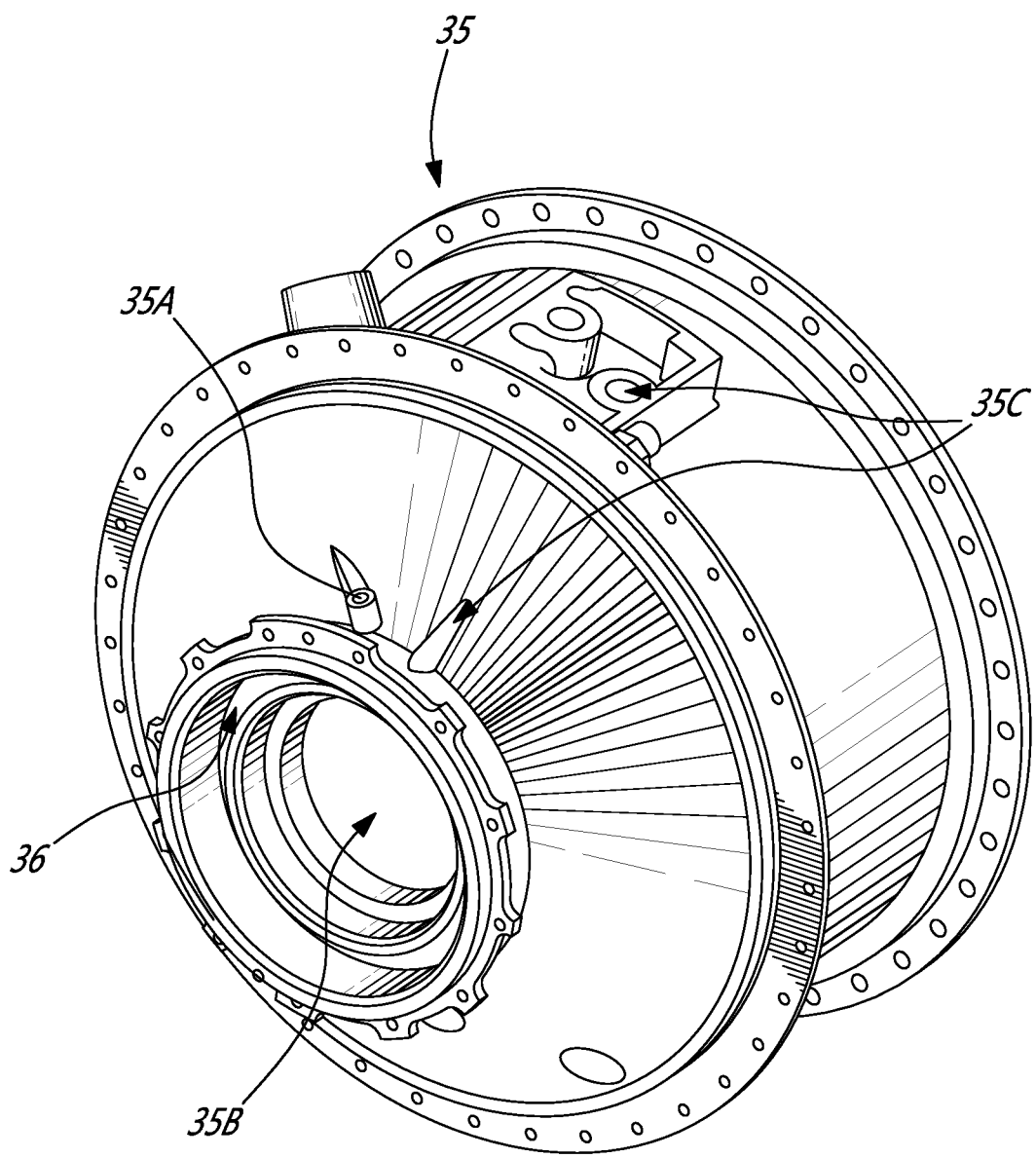
FIG. 3 is a perspective view of a casing for the clutch device of the gas turbine engine of FIG. 1.

An embodiment of the casing 35 is shown in FIG. 3. The casing 35 is an annular body having a central passage 35B for receiving therein the power turbine shaft 15, the input shaft 22 of the gearbox 20, and the sliding coupling 32. The hydraulic fluid cavity 36 is formed between an inner annular body and an outer annular body. A fluid input 35C receives hydraulic fluid from an external source and provides it to the fluid cavity 36. The one or more bleed holes 35A are in fluid communication with the fluid cavity 36 to drain hydraulic fluid from the fluid cavity 36.

Figure 4:
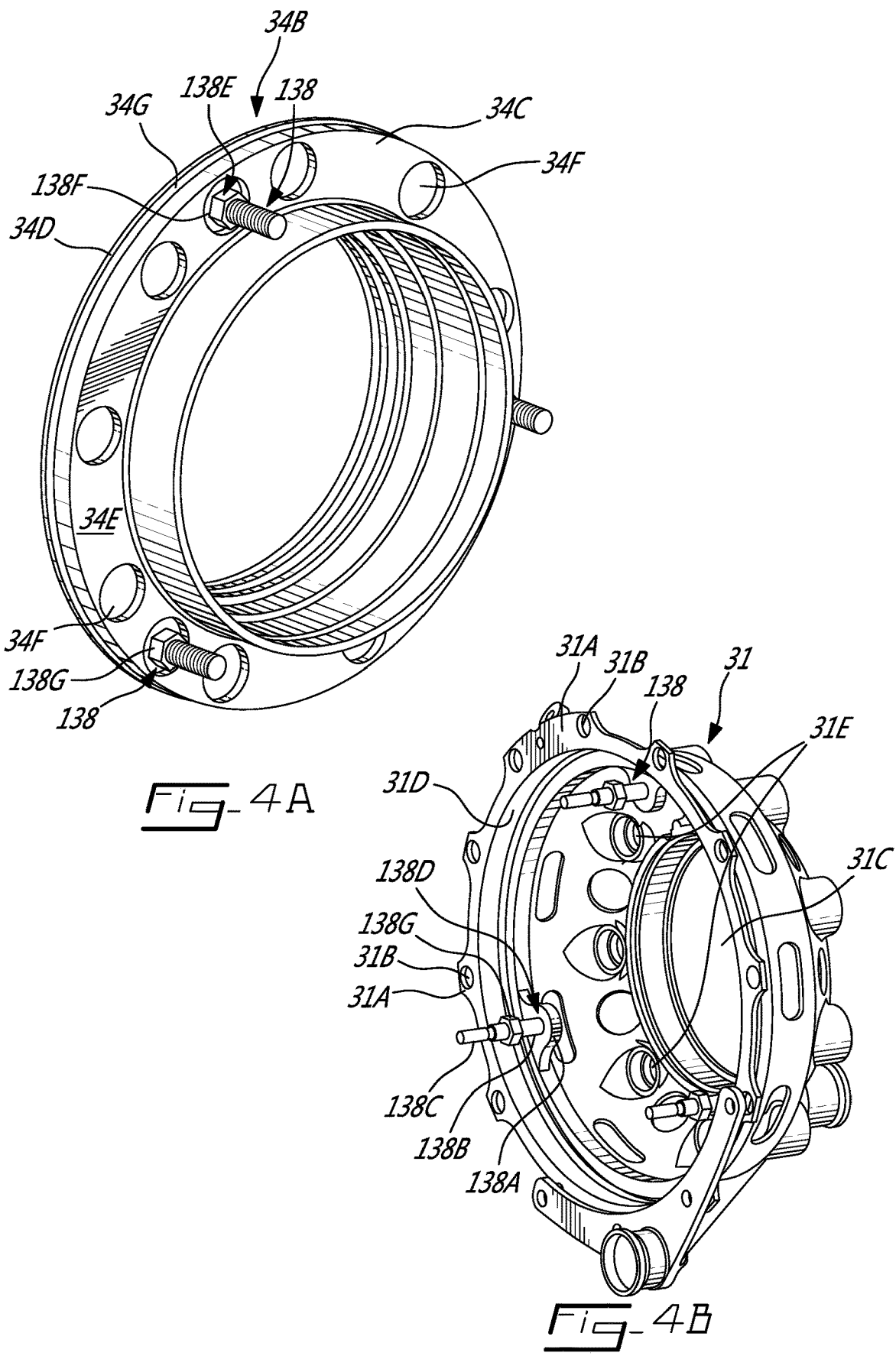
FIG. 4A is a perspective view of a piston for the clutch device of the gas turbine engine of FIG. 1.
FIG. 4B is a perspective view of a clutch cover for the clutch device of the gas turbine engine of FIG. 1.

An embodiment of the hydraulic piston 34B is shown in FIG. 4A. The hydraulic piston 34B is in the form of an annular disc. A piston head 34C of the hydraulic piston 34B has a first surface 34D and an opposite second surface 34E. The first surface 34D faces the hydraulic fluid in the fluid cavity 36 which applies pressure thereagainst. The second surface 34E faces the clutch cover 31 and the biasing members 37, which apply a biasing force thereagainst. The second surface 34E therefore has a plurality of landings 34F. Each landing 34F is a portion of the piston head 34C that is recessed from the second surface 34E. Each landing 34F receives therein the second end 37C of a corresponding biasing member 37. The first and second surfaces 34D,34E are hydraulically isolated from each other by an annular gasket 34G which extends around a peripheral circumference of the piston head 34C. The gasket 34G engages a corresponding surface of the clutch cover 31 to form a seal therewith. It will be appreciated that the piston 34 can take other forms. In an alternate embodiment, the piston 34 includes one or more self-contained hydraulic actuators each with an inner displaceable piston rod which are circumferentially spaced apart. Other configurations are also possible.

An embodiment of the clutch cover 31 is shown in FIG. 4B. The clutch cover 31 includes multiple flanges 31A with corresponding bolt holes 31B which allow the clutch cover 31 to be mounted to the casing 35. The clutch cover 31 is an annular body having an inner central passage 31C for receiving therein the power turbine shaft 15, the input shaft 22 of the gearbox 20, and the sliding coupling 32. An inner circumferential sealing surface 31D helps to define the fluid cavity 36, and engages with the gasket 34G of the hydraulic piston 34B to seal part of the clutch cover 31. The clutch cover 31 has multiple nests 31E for receiving therein the first end 37B of a corresponding biasing member 37.

FIGS. 4A and 4B also show an embodiment of the movement limiters 138 which limit the stroke (i.e. displacement) of the piston 34. One or more of the movement limiters 138 includes a snubber stop 138A. Each snubber stop 138A is a flange protruding radially inward from the sealing surface 31D of the clutch cover 31. Each snubber stop 138A is configured to abut against a surface of the piston 34 to prevent its further rearward displacement. Each snubber stop 138A includes a mounting hole 138B for receiving therein a corresponding displacement rod 138C. Each displacement rod 138C extends between a first end 138D mounted through a corresponding mounting hole 138B and a second end 138E mounted through a corresponding hole 138F in the second surface 34E of the piston 34. Each displacement rod 138C allows the piston 34 to displace therealong and guides displacement thereof. Each displacement rod 138C also prevents the piston 34 from rotating about the longitudinal center axis 11 of the gas turbine engine 10. One or more of the displacement rods 138C includes a nut 138G mounted about a threaded portion of the displacement rod 138C. A portion of the second surface 34E of the piston 34 is engageable with each nut 138G to arrest sliding displacement (i.e. the stroke) of the piston 34. The position of the nut 138G on the outer surface of the displacement rod 138C is adjustable. By adjusting the position of the nut 138G on the displacement rod 138C, it is possible to set the stroke for the piston 34.

Figure 5:
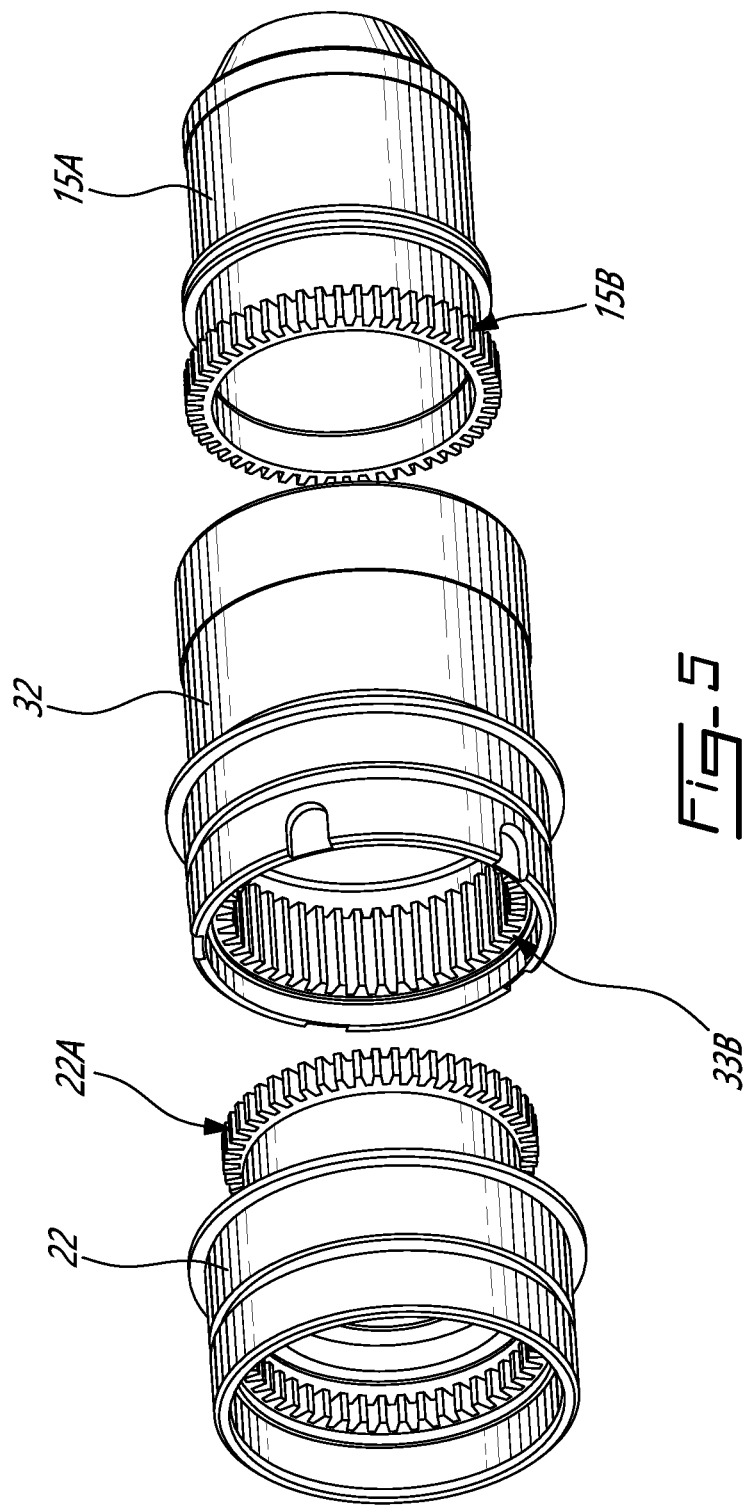
FIG. 5 is an exploded perspective view of a sliding coupling for the clutch device of the gas turbine engine of FIG. 1, being shown with couplings for the gearbox and the output shaft.

An embodiment of the sliding coupling 32, the input gear 22 of the gearbox 20, and a coupling 15A of the power turbine shaft 15 is shown in FIG. 5. Each component is a rotatable cylinder. The coupling 15A of the power turbine shaft 15 has a splined portion 15B on an outer surface thereof which mates with a correspondingly grooved portion along an inner surface of the sliding coupling 32. Similarly, the input gear 22 of the gearbox 20 has a splined portion 22A on an outer surface thereof which mates with a correspondingly grooved portion 33B along the inner surface of the sliding coupling 32. The sliding coupling 32 and the gearbox 20 engage one another and overlap along the splined portion 22A and the grooved portion 33B. The grooved portion 33B of the sliding coupling 32 has a greater axial length than the splined portion 22A of the input gear 22. More particularly, the axial length of the grooved portion 33B is equal to or greater than the stroke of the piston 34. Therefore, as the sliding coupling 32 slides in the rearward or forward direction R,F relative to the stationary input gear 22, the grooved portion 33B will remain continuously meshed with the splined portion 22A. This allows the sliding coupling 32 to remain continuously engaged with the input gear 22 of the gearbox 20. The sliding coupling 32 shown in FIG. 5 therefore is a free spline coupling having a radially internal spline or grooved portion 33B at one end thereof, and a radially internal spline or grooved portion at another end of the sliding coupling 32. The ends of the splines and/or grooves can be rounded and have lead-in chamfers to allow smooth engagement and disengagement.

Figure 6:
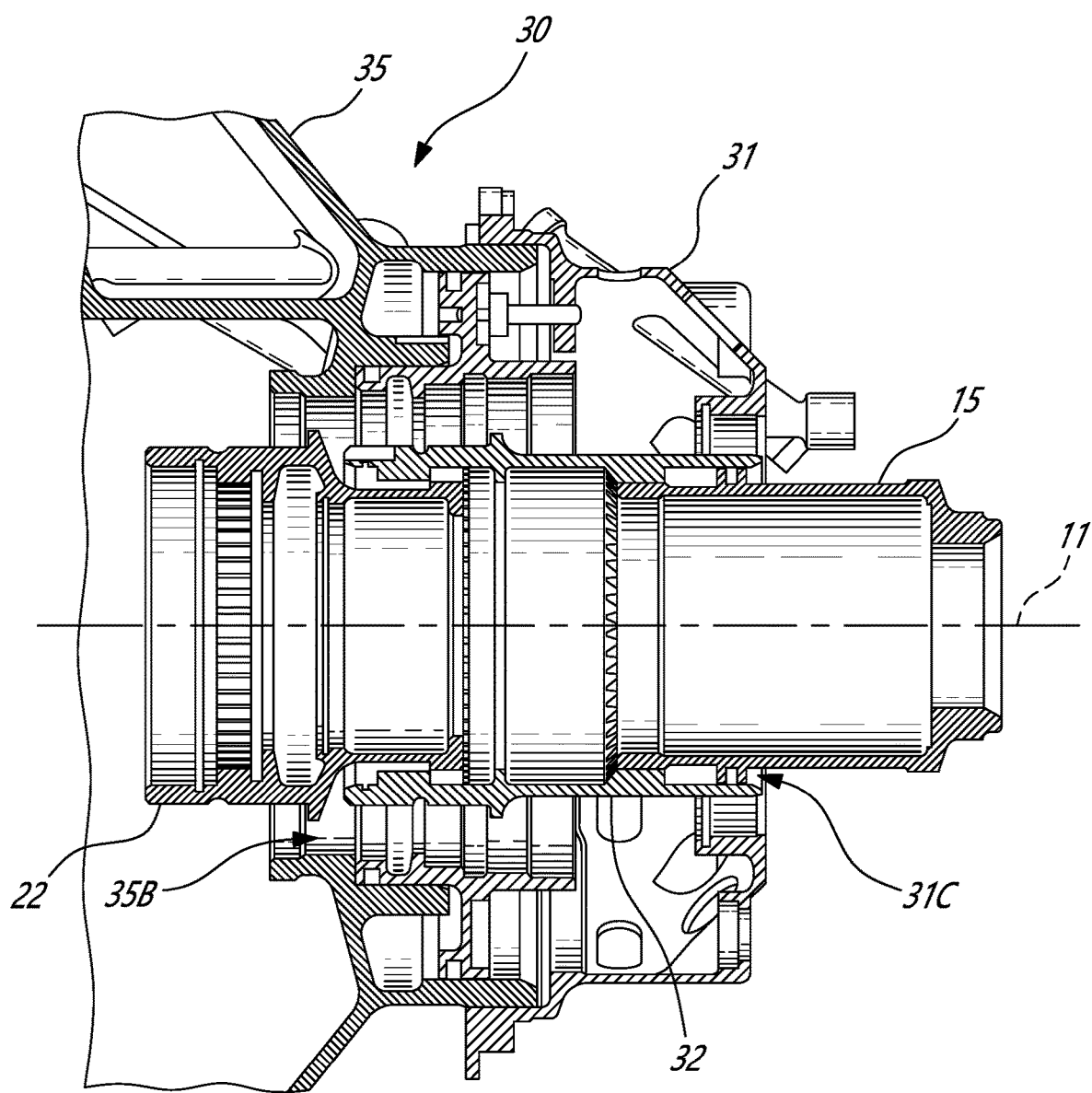
FIG. 6 is a perspective view of the clutch device of the gas turbine engine of FIG. 1 in partial cross-section.

FIG. 6 shows the clutch device 30 with many of the components described herein. More particularly, the clutch device 30 shown has an annular casing 35 mounted to the clutch cover 31. The input gear 22 of the gearbox 20, the sliding coupling 32, and the power turbine shaft 15 are co-axial with the longitudinal center axis 11 and disposed within the central passages 31C,35B of the clutch cover 31 and casing 35, respectively.

Referring to FIG. 2A, there is also disclosed herein a method of mounting the clutch device 30 to the gas turbine engine 10. The method and clutch device 10 disclosed herein can be used to adapt an existing gas turbine engine 10 having the gearbox 20 and the output shaft 15 to function as described above. The method includes positioning the clutch device 30 between the gearbox 30 and the output shaft 15. The method also includes mechanically and continuously coupling the clutch device 30 to the gearbox 20. The method also includes coupling the clutch device 30 to the output shaft 15 to engage the output shaft 15 and transmit a rotational drive of the output shaft 15 to the gearbox 20, and to disengage the output shaft 15.

There is also disclosed herein a method of operating the gas turbine engine 10. The method includes mechanically coupling the clutch device 30 to the output shaft 15 during flight operating mode of the gas turbine engine 10. The clutch device 30 is continuously mechanically coupled to the gearbox 20. The method also includes disengaging the clutch device 30 from the output shaft 15 during ground operating mode of the gas turbine engine 10. The ground operating mode (e.g. ground idle) is a different operating mode from the flight operating mode of the gas turbine engine 10.

Although the clutch device 30 is described herein as selectively coupling the power turbine shaft 15 to the reduction gearbox 20, it will be appreciated that the clutch device 30 disclosed herein is operable to selectively couple other driven and drivable components as well. The clutch device 30 can therefore be used with other gearboxes that use their gearing to modulate the rotational drive received from an output shaft, such as an offset gearbox. The clutch device 30 can similarly be used with other output shafts, which include any suitable mechanical output of the turbomachinery of the gas turbine engine 10. Alternatively, the output shaft can be a separate rotating component which is itself mechanically linked to a rotating shaft of the turbomachinery.

The expressions "mechanically linked" or "mechanically coupled" as used herein refer to the direct connection, or indirect connection (e.g. via gears or a transmission), of components with one another by a suitable mechanical device. In the present specification, including claims, the term "engaged" is intended to include any engagement allowing two components to rotate together, at the same speed or at different speeds, and in the same direction or in different directions, including, but not limited to, direct connections, direct meshed engagement, engagement through meshing with one or more intermediate meshed element(s) (gear, pinion, etc.) and engagement through intermediate elements, e.g. idler gear.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A clutch device for a gas turbine engine having a gearbox and a rotational output shaft, the clutch device comprising:
   a sliding coupling mounted to the engine and slidingly displaceable therein, the sliding coupling being mountable between the gearbox and the output shaft, the sliding coupling being continuously engaged with the gearbox and being selectively engageable with the output shaft to mechanically couple the output shaft to the gearbox, the sliding coupling being slidingly displaceable between a first position in which the sliding coupling is mechanically coupled to the output shaft to transmit a rotational drive of the output shaft to the gearbox, and a second position in which the sliding coupling is disengaged from the output shaft;
   a piston disposed within the engine and acting on the sliding coupling to displace the sliding coupling to at least the second position; and
   a displacement limiter configured to abut against the piston to limit a stroke of the piston, and to prevent rotation of the piston.

2. The clutch device as defined in claim 1, further comprising a clutch housing mounted to the engine and including a clutch cover, the clutch device further comprising at least one biasing member having a first end mounted to the clutch cover and a second end mounted to the piston, the at least one biasing member being operable to biasingly displace the piston and the sliding coupling to the first position, and the piston being operable to displace the sliding coupling only to the second position.

3. The clutch device as defined in claim 1, further comprising a clutch housing including a casing mountable to the gas turbine engine and a clutch cover, the clutch cover being mounted to the casing to define a fluid cavity between the casing and the clutch cover, the piston including a hydraulic piston disposed within the fluid cavity and displaceable therein, the hydraulic piston displacing the sliding coupling at least to the second position upon the fluid cavity filling with hydraulic fluid and exerting a pressure on the hydraulic piston.

4. The clutch device as defined in claim 3, wherein at least one of the casing and the clutch cover has a bleed hole in fluid communication with the fluid cavity, the hydraulic piston being displaceable from the second position upon the fluid cavity being emptied of hydraulic fluid via the bleed hole.

5. The clutch device as defined in claim 4, further comprising at least one biasing member having a first end mounted to the clutch cover and a second end mounted to the hydraulic piston, the at least one biasing member being operable to slidingly displace the hydraulic piston and the sliding coupling to the first position upon the fluid cavity being emptied of hydraulic fluid via the bleed hole.

6. The clutch device as defined in claim 1, wherein the displacement limiter extends between the engine and the piston.

7. The clutch device as defined in claim 6, wherein the at least one displacement limiter includes a displacement rod attached to a clutch housing and mounted to the piston to permit sliding displacement of the piston along the displacement rod, the at least one displacement limiter further including a nut being engageable with the piston to arrest sliding displacement thereof, the nut being mounted about a threaded portion of the displacement rod and displaceable along the threaded portion to fix the stroke of the piston.

8. The clutch device as defined in claim 1, wherein one of the sliding coupling and the output shaft include at least one spline segment, the at least one spline segment being selectively engageable with corresponding grooves in the other of the sliding coupling and the output shaft.

9. A gas turbine engine comprising the clutch device as defined in claim 1, wherein the gearbox is a reduction gearbox having an output end coupled to a propeller and an input shaft continuously engaged with the sliding coupling, the output shaft is a power turbine shaft, and the sliding coupling is mounted aft of the reduction gearbox and forward of the power turbine shaft.

10. The gas turbine engine as defined in claim 9, wherein the input shaft of the reduction gearbox and the power turbine shaft are fixed in position, the sliding coupling being slidingly displaceable relative to the input shaft and the power turbine shaft between the first and the second positions.

11. The gas turbine engine as defined in claim 9, wherein one of the sliding coupling and the input shaft of the reduction gearbox include at least one spline segment, the at least one spline segment being selectively engageable with corresponding grooves in the other of the sliding coupling and the input shaft, an axial length of one of the spline segment and the grooves being equal to or greater than a stroke of the piston.

12. A method of mounting a clutch to a gas turbine engine having a gearbox and an output shaft, the method comprising:
   positioning the clutch between the gearbox and the output shaft;
   forming a continuous mechanical coupling between a sliding sleeve of the clutch and the gearbox;
   coupling the sliding sleeve to the output shaft to engage the output shaft and transmit a rotational drive of the output shaft to the gearbox, and to disengage the sliding sleeve from the output shaft;
   providing a piston to displace the sliding sleeve to at least disengage from the output shaft; and
   providing a displacement limiter to abut against the piston to limit a stroke of the piston and to prevent rotation of the piston.

13. The method as defined in claim 12, wherein coupling the clutch includes mechanically coupling the clutch to the output shaft for a flight operating mode of the gas turbine engine.

14. The method as defined in claim 13, wherein coupling the clutch includes disengaging the clutch from the output shaft during a ground operating mode of the gas turbine engine.

15. The method as defined in claim 12, wherein positioning the clutch between the gearbox and the output shaft includes positioning the clutch aft of the gearbox and forward of the output shaft.

* * * * *